US012592398B2

(12) United States Patent
Stephan et al.

(10) Patent No.: US 12,592,398 B2
(45) Date of Patent: Mar. 31, 2026

(54) FUEL CELL COMPRISING A BIPOLAR MODULE CAPABLE OF GENERATING HEAT

(71) Applicant: SAFRAN POWER UNITS, Toulouse (FR)

(72) Inventors: Rémi André Armand Stephan, Moissy-Cramayel (FR); Théophile Horde, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 524 days.

(21) Appl. No.: 18/250,550

(22) PCT Filed: Oct. 28, 2021

(86) PCT No.: PCT/EP2021/080013
§ 371 (c)(1),
(2) Date: Apr. 26, 2023

(87) PCT Pub. No.: WO2022/096368
PCT Pub. Date: May 12, 2022

(65) Prior Publication Data
US 2023/0411644 A1 Dec. 21, 2023

(30) Foreign Application Priority Data
Nov. 5, 2020 (FR) .................................. FR2011392

(51) Int. Cl.
*H01M 8/0258* (2016.01)
*H01M 4/92* (2006.01)
(Continued)

(52) U.S. Cl.
CPC ........... *H01M 8/0258* (2013.01); *H01M 4/92* (2013.01); *H01M 8/04007* (2013.01); *H01M 8/1004* (2013.01); *H01M 2004/8694* (2013.01)

(58) Field of Classification Search
CPC .. H01M 8/0258; H01M 4/92; H01M 8/04007; H01M 8/1004;
(Continued)

(56) References Cited

U.S. PATENT DOCUMENTS

2003/0022052 A1* 1/2003 Kearl .................. H01M 8/0228
216/17
2004/0229099 A1* 11/2004 Standke ................ H01M 8/242
429/456
(Continued)

FOREIGN PATENT DOCUMENTS

EP 1351330 A2 10/2003
EP 2061113 A1 5/2009

OTHER PUBLICATIONS

International Search Report, International Application No. PCT/EP2021/080013, dated Feb. 11, 2022, 2 pages.

*Primary Examiner* — Muhammad S Siddiquee
(74) *Attorney, Agent, or Firm* — RANKIN, HILL & CLARK LLP

(57) ABSTRACT

A fuel cell comprising alternating bipolar modules and membrane-electrode assemblies so as to form a stack comprising at least one electrochemical cell. Each bipolar module comprising at least a first main channel for the circulation of an oxidising fluid, a second main channel for the circulation of a reducing fluid and a third main channel for the circulation of a heat-transfer fluid. The fuel cell comprises at least one heating module, comprising at least one auxiliary channel comprising a catalyst chemical element, the auxiliary channel being configured to circulate a mixture of oxidising fluid and reducing fluid so as to generate heat upon reaction of the oxidising fluid, the reducing fluid and the catalyst chemical element. The auxiliary channel is formed by positioning a spacer plate between two plates.

11 Claims, 9 Drawing Sheets

(51) Int. Cl.
H01M 8/04007     (2016.01)
H01M 8/1004     (2016.01)
*H01M 4/86*     (2006.01)

(58) Field of Classification Search
CPC ....... H01M 2004/8694; H01M 8/0267; H01M 8/241; H01M 8/249; H01M 8/04022; Y02E 60/50
See application file for complete search history.

(56) References Cited

U.S. PATENT DOCUMENTS

| | | | |
|---|---|---|---|
| 2008/0102327 A1* | 5/2008 | Docter .................... | H01M 4/92 |
| | | | 429/444 |
| 2008/0118788 A1* | 5/2008 | Cartwright ........ | H01M 8/04302 |
| | | | 429/513 |
| 2009/0130501 A1* | 5/2009 | Wieland .............. | H01M 8/0618 |
| | | | 429/415 |
| 2017/0373336 A1* | 12/2017 | Hayashi .............. | H01M 8/0254 |
| 2018/0212258 A1* | 7/2018 | Scholz ................ | H01M 8/0258 |

* cited by examiner

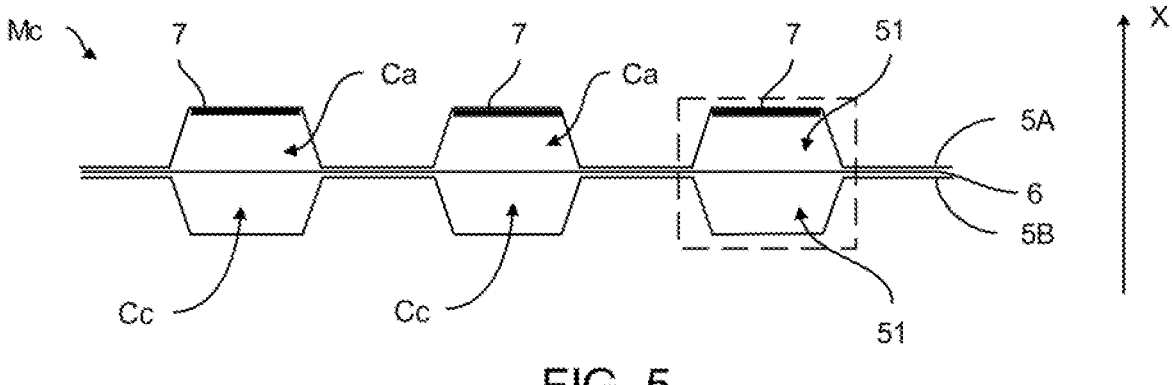
_FIG. 5_
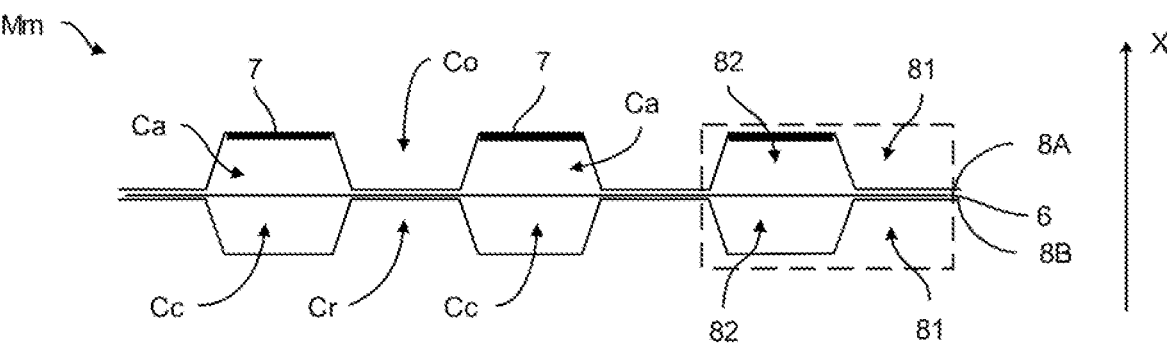
_FIG. 6_
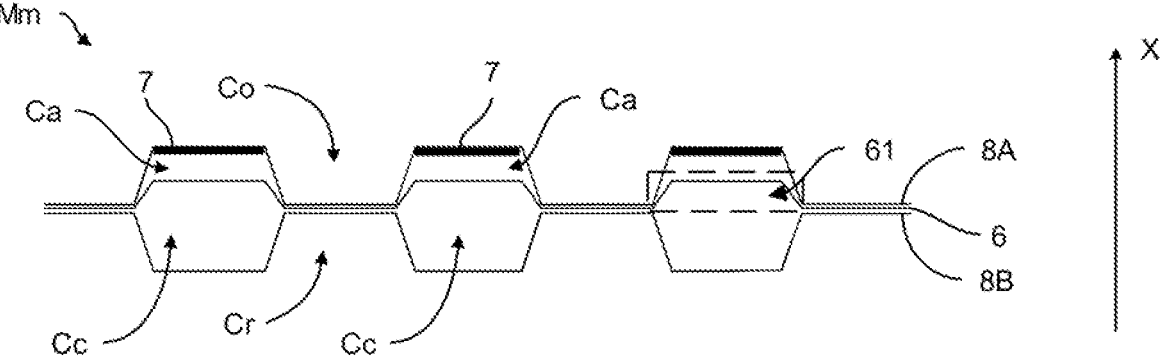
_FIG. 7_

FUEL CELL COMPRISING A BIPOLAR MODULE CAPABLE OF GENERATING HEAT

TECHNICAL FIELD

The present invention relates to the field of fuel cells and more particularly proton-exchange high-temperature fuel cells.

In a known manner, in reference to FIGS. 1 and 2, a fuel cell 100 extends longitudinally along a stacking axis X and comprises a stack 110 of a plurality of bipolar modules 120, each formed by an assembly of two bipolar plates 130A, 130B. The fuel cell 100 successively comprises alternating bipolar modules 120 and membrane-electrode assemblies A, abbreviated as MEA. In a known manner, each MEA comprises an electrolyte membrane and two electrodes (one anode and one cathode) positioned on either side of the membrane.

The fuel cell 100 also comprises two end plates 140, placed at the ends of the stack 110, as shown in FIG. 1. The end plates 140 are connected by tie rods (not shown) which allow the stack 110 to be compressed, thus sealing the fuel cell 100.

In a known manner, a membrane-electrode assembly A and two bipolar plates 130, sandwiching the membrane-electrode assembly A, form an electrochemical cell 150.

To form an electrochemical reaction in the fuel cell 100, each bipolar module 120 is, in a known manner, supplied by an oxidizing fluid and a reducing fluid, for example dihydrogen and dioxygen, which react when they are brought into contact in an oxidation-reduction reaction so as to generate electrical energy. Each bipolar module 120 is also supplied with heat-transfer fluid, for thermal regulation of the fuel cell 100. The bipolar plates 130 of a bipolar module 120 enable such fluids to be distributed in the electrochemical cell 150.

To do this, as shown in FIG. 2, each bipolar plate 130A, 130B of a bipolar module 120 comprises concave portions 131, inside the electrochemical cell 150, and convex portions 132, outside the electrochemical cell 150, allowing the formation of internal channels in the bipolar module 120 for the circulation of the different fluids. In a known manner, the concave portions 131 allow the formation of a channel Co for the circulation of the oxidizing fluid and a channel Cr for the circulation of the reducing fluid.

In a known manner, for the formation of a bipolar module 120, the concave portions 131 of the two bipolar plates 130A, 130B are joined together so that the convex portions 132 form a channel Cc for the circulation of the heat-transfer fluid in the bipolar module 120. Such a heat-transfer fluid allows the heat produced during heating of the fuel cell 100 to be removed and maintained at its nominal operating temperature.

In a known manner, when the fuel cell is started, it must first be heated to above 100° C. in order to avoid the presence of water in the liquid state. Once heated, the fuel cell may be supplied with reagents and produce electricity. Several solutions exist in the prior art for heating the fuel cell.

Firstly, it is known to provide a heating device, independent of the fuel cell, for example an electrical resistance, to heat the channel for the circulation of the heat-transfer fluid of the fuel cell. In other words, the heat-transfer fluid is cleverly used to heat the fuel cell during start-up and to cool it when it is in nominal operation.

In order to guarantee the autonomy of the fuel cell, such an electrical resistance is supplied with electrical power by a supply battery. However, the amount of energy required to supply such an electrical resistance is very high. Such a supply battery has a high cost and a large mass, which has a major disadvantage for on-board use, in particular, in an aircraft.

Also known by document WO2014136098 is a heating device that comprises an independent catalytic reactor to heat the channel for the circulation of the heat-transfer fluid of the fuel cell. Unlike resistive heating which requires a source of electricity, the catalytic reactor teaches to have the oxidizing and reducing fluids react with a catalyst chemical element, so as to generate a mixture of water and heat to heat the heat-transfer fluid. Such a solution is advantageous as the catalytic reactor uses the same oxidizing and reducing fluids as the fuel cell.

However, such an independent heating device does not allow optimal heating of the fuel cell due to heat losses during the circulation of the heat-transfer fluid. In addition, such a heating device significantly increases the size and mass of the fuel cell, as shown above.

The invention thus aims to eliminate at least some of these disadvantages by proposing a fuel cell comprising a simple and effective heating system allowing a homogeneous temperature increase of the fuel cell. The fuel cell comprising the heating system according to the invention is also lightweight and is small, which allows it to be integrated into any type of vehicle.

SUMMARY

The invention relates to a fuel cell extending longitudinally along a stacking axis and comprising alternating bipolar modules and membrane-electrode assemblies so as to form a stack comprising at least one electrochemical cell, two end plates extending to the ends of the stack, each bipolar module comprising at least one first main channel for the circulation of an oxidizing fluid, a second main channel for the circulation of a reducing fluid and a third main channel for the circulation of a heat-transfer fluid.

The fuel cell is remarkable in that it comprises at least one heating module, mounted between the end plates, comprising at least one auxiliary channel comprising a catalyst chemical element, the auxiliary channel being configured to circulate a mixture of oxidizing fluid and reducing fluid so as to generate heat upon reaction of the oxidizing fluid, the reducing fluid and the catalyst chemical element in order to heat the fuel cell.

The fuel cell according to the invention makes it possible to integrate a heating system directly at the core of the stack to allow initial heating of the fuel cell when it is started. Thanks to the invention, it is not necessary to add external equipment to the fuel cell or an additional energy source to enable this increase in temperature.

In addition, the integration of a heating module mounted between the end plates limits dissipation and thus heat loss, making it possible to significantly reduce the heating time of the fuel cell. The temperature increase is also advantageously homogeneous.

The fuel cell according to the invention also has a small size and a limited mass, which makes it possible to integrate it into onboard systems and in particular in an aircraft.

Each electrochemical cell may advantageously be heated when the fuel cell is started by conduction.

Preferably, the heating module comprises at least one main channel for the circulation of the heat-transfer fluid, enabling the heat-transfer fluid to be heated in the heating module as close as possible to the auxiliary channel. The heat-transfer fluid thus heated circulating in each electrochemical cell makes it possible to heat the entire fuel cell.

In one embodiment, the heating module is free of the main channel for the circulation of the oxidizing fluid and the main channel for the circulation of the reducing fluid. The heating module is thus able to generate only heating, making it possible to form a heating module that is simpler and less expensive.

Preferably, the fuel cell comprises a plurality of heating modules, allowing a faster and more efficient increase in temperature.

In a preferred embodiment, at least one bipolar module is a heating module, referred to as a mixed module, the mixed module comprising at least one first main channel for the circulation of the oxidizing fluid, a second main channel for the circulation of the reducing fluid, a third main channel for the circulation of the heat-transfer fluid, and an auxiliary channel, comprising a catalyst chemical element, which is configured to circulate a mixture of oxidizing fluid and reducing fluid. A mixed module makes it possible to form a module comprising two bipolar plates directly integrating the auxiliary channel comprising the catalyst chemical element. In other words, a mixed module makes it possible, on the one hand, to heat prior to start-up and, on the other hand, to generate electricity in nominal operation. The fuel cell thus comprises bipolar modules with integrated heating which makes it possible to individually heat each bipolar module.

Preferably, the fuel cell comprises at least two mixed modules and at least one membrane-electrode assembly positioned between the two mixed modules so as to form a mixed cell capable of generating both electrical energy and heat. A mixed cell allows the heating function to be integrated directly into the core of an electrochemical cell, which is a substantial advantage since it allows the addition of an independent heating module to be limited. The fuel cell according to the invention thus has a size and a mass substantially equivalent to those of a fuel cell of the prior art while integrating a heating function.

More preferably, the fuel cell comprises an alternation of a plurality of mixed modules and membrane-electrode assemblies so as to form a stack of a plurality of mixed cells. Such a stack makes it possible to form a high-performance fuel cell, wherein all the cells are able to generate both heat and electrical energy. The increase in temperature is thus rapid and homogeneous across the entire fuel cell.

Preferably, each mixed module comprising a first bipolar plate and a second bipolar plate, each bipolar plate comprising at least one concave portion external to the mixed module and a convex portion internal to the mixed module, the convex portion of the first bipolar plate being positioned opposite the convex portion of the second bipolar plate, the convex portions mounted opposite forming a circulation channel, each mixed module comprises a spacer plate, mounted between the first bipolar plate and the second bipolar plate so as to form in the circulation channel, the third main channel for the circulation of the heat-transfer fluid and the auxiliary channel. Such a spacer plate makes it possible to simply create the auxiliary channel comprising the catalyst chemical element directly adjacent to the third main channel for the circulation of the heat-transfer fluid.

In one embodiment, the fuel cell comprises at least one intermediate plate between the end plates defining a first stacking part comprising a first plurality of modules and a second stacking part comprising a second plurality of modules. The two stacking parts may thus be used individually according to the requirements of the fuel cell.

In a first embodiment, each module of the first stacking part is a bipolar module and each module of the second stacking part is a heating module. The first stacking part and the second stacking part are thus of different natures and are able to generate either only electrical energy, or only heat. Such an embodiment makes it possible to separate the heating modules from the electrochemical cells, allowing the fuel cell to be used in two stages, by first supplying the second stacking part with fluids for heating the cell, then the first stacking part for generating electrical energy. Separating the heating cells from the electrochemical cells also makes it possible for example to mount different stacks in the intermediate plate to supply the electrochemical cells on the one hand and the heating modules on the other.

In a second embodiment, all the modules of the first stacking part and of the second stacking part are mixed modules. The modules of both stacking parts are thus of the same nature and, for example, allow for sectoral use of the cell. Thanks to the intermediate plate, it is possible to supply fluids only to one or both parts of the stack. Such a sectorization makes it possible in certain cases to limit the use of an excessive number of mixed cells to generate electrical energy when this is not useful, which makes it possible to increase the service life of the cells. Such an embodiment also makes it possible to limit the supply of fluids to the fuel cell when this is not necessary, which allows for savings in fluids and also enables the autonomy of the fuel cell to be increased.

Preferably, the catalyst chemical element is platinum, allowing the use of a known chemical element the application of which in the auxiliary channel is simple.

The invention also relates to a method of using a fuel cell such as described previously, the method of use comprises:

a step of heating the fuel cell by circulating the oxidizing fluid and the reducing fluid in the auxiliary channel of at least one heating module, then, a step of generating electrical energy by circulating the oxidizing fluid and reducing fluid in the bipolar modules.

In one embodiment, the fuel cell having an operating temperature, the method comprises, after the step of generating electrical energy, when the operating temperature of the fuel cell is greater than or equal to a predetermined threshold, a step of stopping circulation of the oxidizing fluid and the reducing fluid in the auxiliary channel of the heating module, so as to stop the generation of heat from the mixture between the oxidizing fluid, reducing fluid and catalyst chemical element.

DESCRIPTION OF THE DRAWINGS

The invention will be better understood upon reading the following description, given as an example, and by referring to the following figures, given as non-limiting examples, wherein identical references are given to similar objects.

FIG. 5 is a schematic representation of a heating module of the fuel cell of FIG. 3.

FIG. 6 is a schematic representation of a mixed module of the fuel cell of FIG. 3, according to a first embodiment of the invention.

FIG. 7 is a schematic representation of a mixed module of the fuel cell of FIG. 3, according to a second embodiment of the invention.

It should be noted that the figures set out the invention in detail in order to implement the invention, said figures may of course be used to better define the invention if necessary.

DETAILED DESCRIPTION

The invention relates to a high-temperature fuel cell capable of generating heat at start-up to enable the fuel cell to be supplied with reagents and produce electricity.

Figure 1:
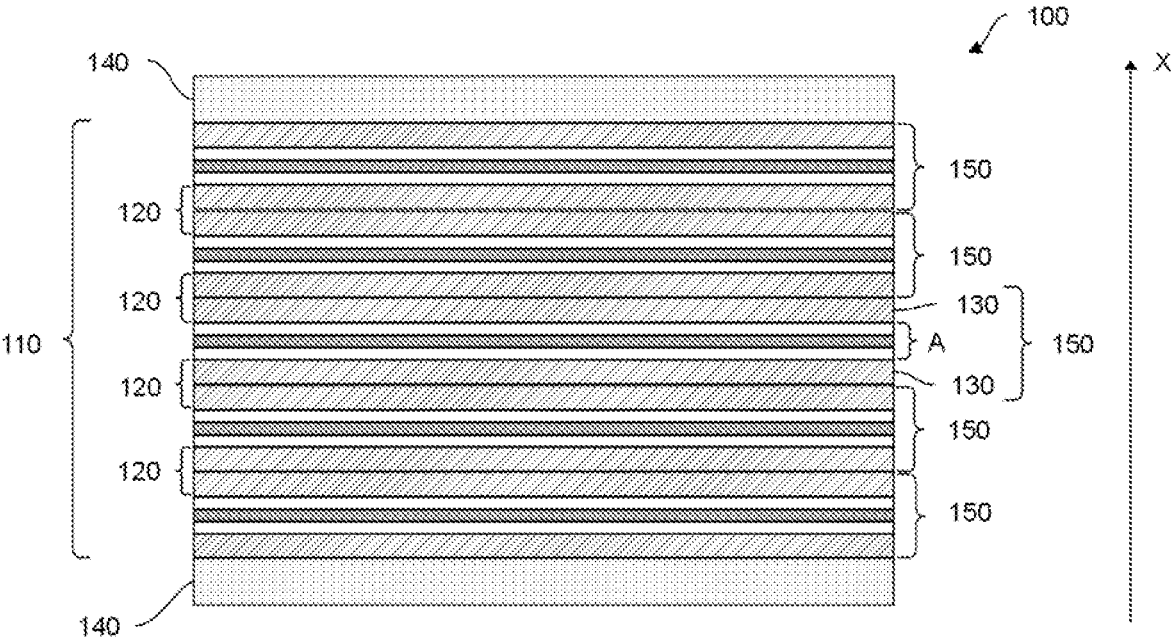
FIG. 1 is a schematic representation of a stack of a fuel cell of the prior art.
Figure 2:
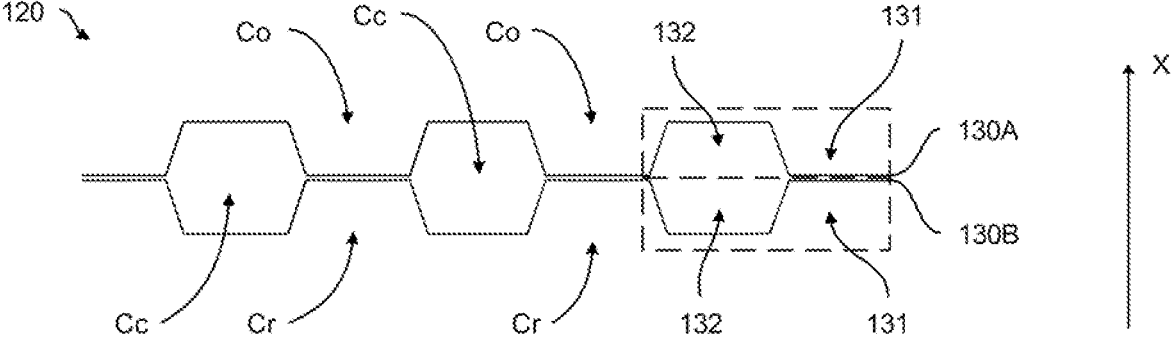
FIG. 2 is a schematic representation of a bipolar module of the fuel cell of FIG. 1.
Figure 3:
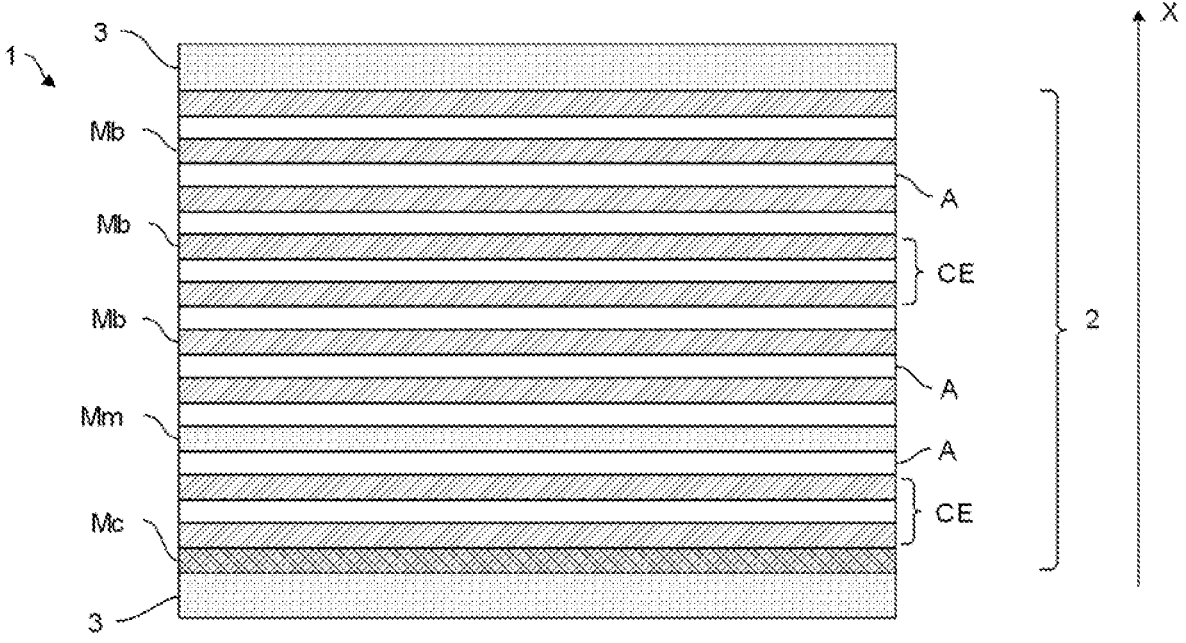
FIG. 3 is a schematic representation of a fuel cell according to one embodiment of the invention.

In reference to FIG. 3 showing a fuel cell 1 according to one embodiment of the invention, the fuel cell 1 extends longitudinally along a stacking axis X and comprises alternating bipolar modules Mb and membrane-electrode assemblies A so as to form a stack 2 of electrochemical cells CE. The fuel cell 1 also comprises two end plates 3 extending to the ends of the stack 2, which enable the different reagent fluids to be distributed. As is known, fuel cell 1 is thus supplied by an oxidizing fluid and a reducing fluid, for example dihydrogen and dioxygen, and by a heat-transfer fluid for thermal regulation of the cell.

Figure 4:
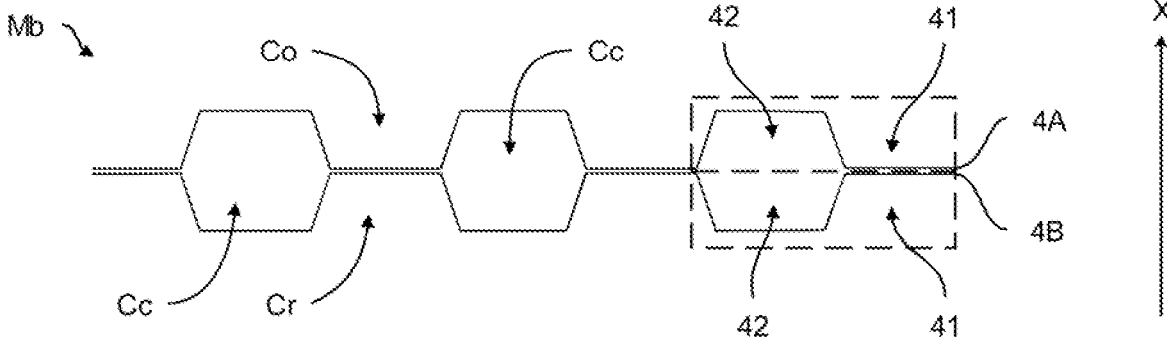
FIG. 4 is a schematic representation of a bipolar module of the fuel cell of FIG. 3.

In reference to FIG. 4, each bipolar module Mb comprises two bipolar plates 4A, 4B mounted opposite each other, the two bipolar plates 4A, 4B preferably being welded to each other. Each bipolar plate 4A, 4B comprises concave portions 41 and convex portions 42, which enable channels to be formed for circulation of reagent fluids. More precisely, the concave portions 41 are external to the bipolar module Mb and allow, on either side of the bipolar module Mb, circulation of the oxidizing fluid and the reducing fluid respectively through a first main channel Co for the circulation of the oxidizing fluid and a second main channel Cr for the circulation of the reducing fluid. The convex portions 42 are internal to the bipolar module Mb and together form a third main channel Cc for the circulation of the heat-transfer fluid. The third main channel Cc is thus an internal channel to the bipolar module Mb.

As known, oxidizing and reducing fluids react when brought into contact through a membrane-electrode assembly in an oxidation-reduction reaction to generate electrical energy.

The bipolar plates 4A, 4B are preferably made of a metallic or composite material so as to be robust. To supply each bipolar module Mb with oxidizing, reducing and heat-transfer fluids, the end plates 3 comprise a plurality of main stacks (not shown), connected to the main channels Co, Cr, Cc. The bipolar plates 4A, 4B of an electrochemical cell CE are known per se and will not be described in more detail in this document.

In reference to FIG. 3, the fuel cell 1 according to the invention further comprises a heating module Mc mounted between the end plates 3.

As shown in FIG. 5, the heating module Mc comprises two heating plates 5A, 5B mounted opposite each other. In this example, each heating plate 5A, 5B has properties similar to those of a bipolar plate 4A, 4B, but of course they could be different. Each heating plate 5A, 5B comprises convex portions 51, internal to the heating module Mc, forming a channel for the circulation of fluids. The heating module Mc thus comprises an auxiliary channel Ca, configured to allow circulation of a mixture of oxidizing fluid and reducing fluid. The heating module Mc is thus configured to allow heating of the fuel cell 1 by conducting heat into the different modules, as will be described in more detail later.

In a preferred embodiment, the heating module Mc also comprises a spacer plate 6, mounted between the two heating plates 5A, 5B so as to form in the circulation channel both a main channel Cc for the circulation of the heat-transfer fluid and the auxiliary channel Ca for the circulation of a mixture of oxidizing fluid and reducing fluid. In other words, preferably, the heating module Mc comprises two separate internal channels: a main channel Cc for the circulation of the heat-transfer fluid and an auxiliary channel Ca. The auxiliary channel Ca is thus configured to heat the heat-transfer fluid circulating in the main channel Cc, as will be described in more detail later in this document.

In this example, the spacer plate 6 is in the form of a flat plate with properties similar to the properties of a bipolar plate 4A, 4B.

In this embodiment, the heating module Mc comprises only the third main channel Cc for the circulation of the heat-transfer fluid and the auxiliary channel Ca. The heating module Mc thus allows only heating to be generated, without generating electrical energy, which enables the formation of a simple heating module Mc.

In this example, the heating module Mc is configured to be supplied with oxidizing fluid, reducing fluid, and heat-transfer fluid via the stacks of the end plates 3 connected to the channels Cc, Ca for the circulation of fluids, as is the case in a conventional bipolar module Mb. Alternatively, the end plates 3 may also comprise an additional stack to directly supply the auxiliary channel Ca with a mixture of oxidizing fluid and reducing fluid.

The auxiliary channel Ca comprises a catalyst chemical element 7, configured to react with the mixture of oxidizing fluid and reducing fluid so as to generate heat. Preferably, the catalyst chemical element 7 is in the form of a platinum layer, applied to an inner surface of the auxiliary channel Ca, i.e. on the surface of the convex portions 51 internal to the heating module Mc. Platinum has properties that promote the reaction of the mixture of oxidizing fluid and reducing fluid and generate heat and water. It goes without saying that the catalyst chemical element 7 may be in a different form.

The auxiliary channel Ca is configured to heat due to the exothermic reaction between the oxidizing fluid, the reducing fluid and the catalyst chemical element 7. Since the main channel Cc for the circulation of the heat-transfer fluid is adjacent to the auxiliary channel Ca in the heating module Mc, the heat-transfer fluid is effectively heated. The heated heat-transfer fluid is configured to circulate in the heating module Mc and then through each bipolar module Mb to heat the fuel cell 1 at start-up, as will be described in more detail later.

The heating module Mc thus allows heating of the fuel cell 1 by circulation of the heat-transfer fluid but also by heating the adjacent bipolar modules Mb by thermal conduction. In the case of a heating module without a main channel Cc for the circulation of the heat-transfer fluid, the Mc heating module allows heating of the fuel cell 1 by thermal conduction between the different modules.

Figure 8:
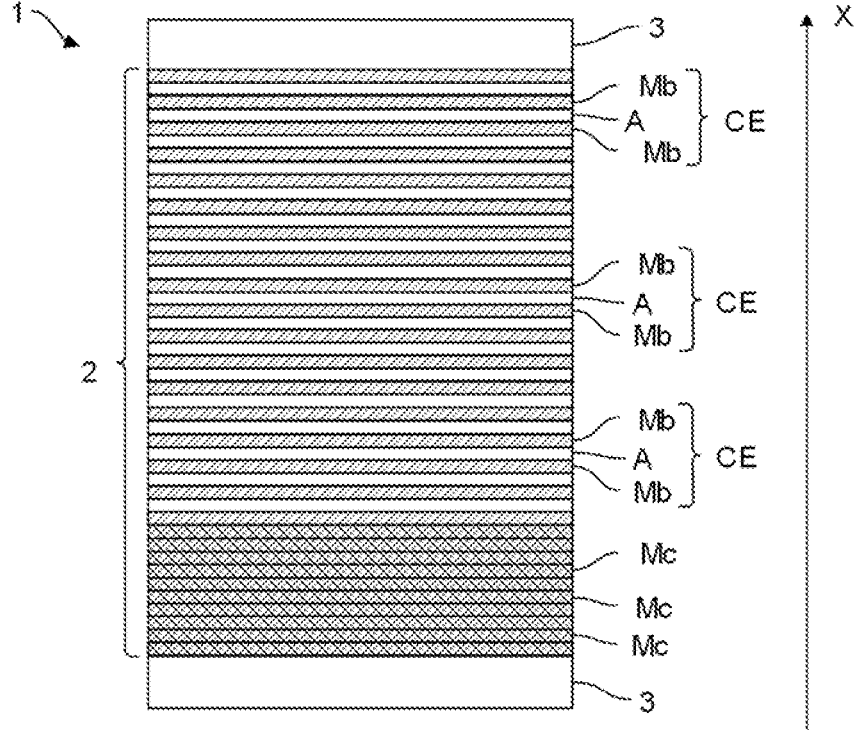
FIGS. 8 to 13 are schematic representations of a fuel cell according to different embodiments of the invention.

A fuel cell 1 comprising a single heating module Mc has been shown in FIG. 3, but it goes without saying that it could comprise a plurality of heating modules Mc, as shown in FIG. 8.

Preferably, at least one of the bipolar modules Mb of the fuel cell 1 is a heating module Mc. The module is then referred to as mixed module Mm and is configured to both generate heat and electrical energy.

In reference to FIGS. 6 and 7, the mixed module Mm comprises a first bipolar plate 8A and a second bipolar plate 8B, mounted opposite each other. The two bipolar plates 8A, 8B are preferably similar to the bipolar plates 4A, 4B of a bipolar module Mb, described previously. As such, each bipolar plate 8A, 8B comprises concave portions 81, external to the mixed module Mm, and convex portions 82, internal to the mixed module Mm. The convex portions 82 are mounted opposite so that the two bipolar plates 8A, 8B may be fixed to form the mixed module Mm. Similarly to the bipolar module Mb, the concave portions 81 enable the formation of a first main channel Co for the circulation of the oxidizing fluid and a second main channel Cr for the circulation of the reducing fluid. The convex portions 82 together form a circulation channel.

According to a preferred embodiment of the invention, each mixed module Mm further comprises a spacer plate 6, mounted between the first bipolar plate 8A and the second bipolar plate 8B so as to separate the circulation channel formed by the convex portions 81 into two separate channels. The spacer plate 6, similar to a spacer plate 6 of the previously described heating module Mc, thus makes it possible to form a third main channel Cc for the circulation of the heat-transfer fluid and an auxiliary channel Ca. In other words, the mixed module Mm comprises two separate internal channels: a main channel Cc for the circulation of the heat-transfer fluid and an auxiliary channel Ca.

Similarly to the heating module Mc, the auxiliary channel Ca comprises a catalyst chemical element 7, configured to react with a mixture of oxidizing fluid and reducing fluid to generate heat. The third main channel Cc for the circulation of heat-transfer fluid is thus adjacent to the auxiliary channel Ca, so as to effectively heat the heat-transfer fluid in contact with the auxiliary channel Ca.

The spacer plate 6 is preferably in the form of a plate similar to the bipolar plates 8A, 8B.

In a first embodiment, shown in FIG. 6, the spacer plate 6 is free of concave or convex portions and is in the form of a flat plate. Such a spacer plate 6 enables the formation of a single mixed module Mm, wherein the third main channel Cc for the circulation of the heat-transfer fluid and the auxiliary channel Ca have a similar volume.

In a second embodiment, shown in FIG. 7, the spacer plate 6 comprises convex portions 61, so as to allow a volume in the third main channel Cc for the circulation of the heat-transfer fluid greater than the volume in the auxiliary channel Ca. Such an embodiment allows the mixed module Mm to allow circulation of a substantially equivalent volume of heat-transfer fluid in the third main channel Cc in modules of different types (bipolar module Mb, heating module Mc and mixed module Mm). Thus, the cooling of the Mm mixed module remains efficient during the generation of electrical energy.

This document presents the example of a mixed module Mm comprising a spacer plate 6 for the formation of the auxiliary channel Ca, however, it goes without saying that the mixed module Mm may be in a different form. In particular, the mixed module Mm may be free of a spacer plate 6 between the two bipolar plates 8A, 8B. In this case, the third main channel Cc of each mixed module Mm dedicated to the circulation of heat-transfer fluid could have one or more cavities covered with the chemical catalyst element 7.

Figure 10:
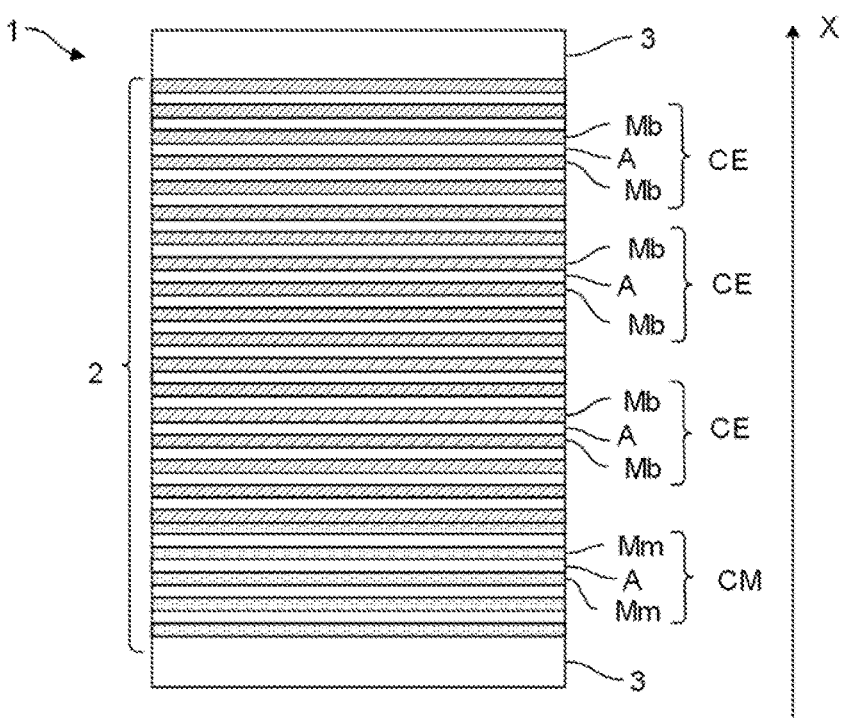

In this embodiment, a membrane-electrode assembly A is preferably positioned between two mixed modules Mm so as to form a mixed cell CM capable of generating both electrical energy and heat, as shown for example in FIG. 10.

More preferably, the fuel cell 1 comprises a plurality of mixed modules Mm and a membrane-electrode assembly A positioned between each pair of two mixed modules Mm, so as to form a plurality of mixed cells CM capable of generating electrical energy and heat. A plurality of CM mixed cells enables fast heating of fuel cell 1 at start-up, advantageously enabling a faster start-up and thus increased efficiency. The mixed cells CM are therefore heated internally prior to use.

In this example, preferably, the mixed module Mm is configured to be supplied with oxidizing fluid, reducing fluid, and heat-transfer fluid via the stacks of the end plates 3 connected to the fluid circulation channels, as is the case in a conventional bipolar module Mb. In this embodiment, each end plate 3 may also comprise an additional stack to directly supply the auxiliary channel Ca with a mixture of oxidizing fluid and reducing fluid.

Thanks to the spacer plate 6 according to the invention, each heating module Mc and each mixed module Mm has a size substantially similar to the size of a bipolar module Mb while integrating a heating function, which makes it possible to heat the fuel cell 1 without increasing the overall size. As will be presented later, one or more heating modules Mc and/or one or more mixed modules Mm may be integrated into a stack of bipolar modules Mb to heat the stack 2.

Figure 9:
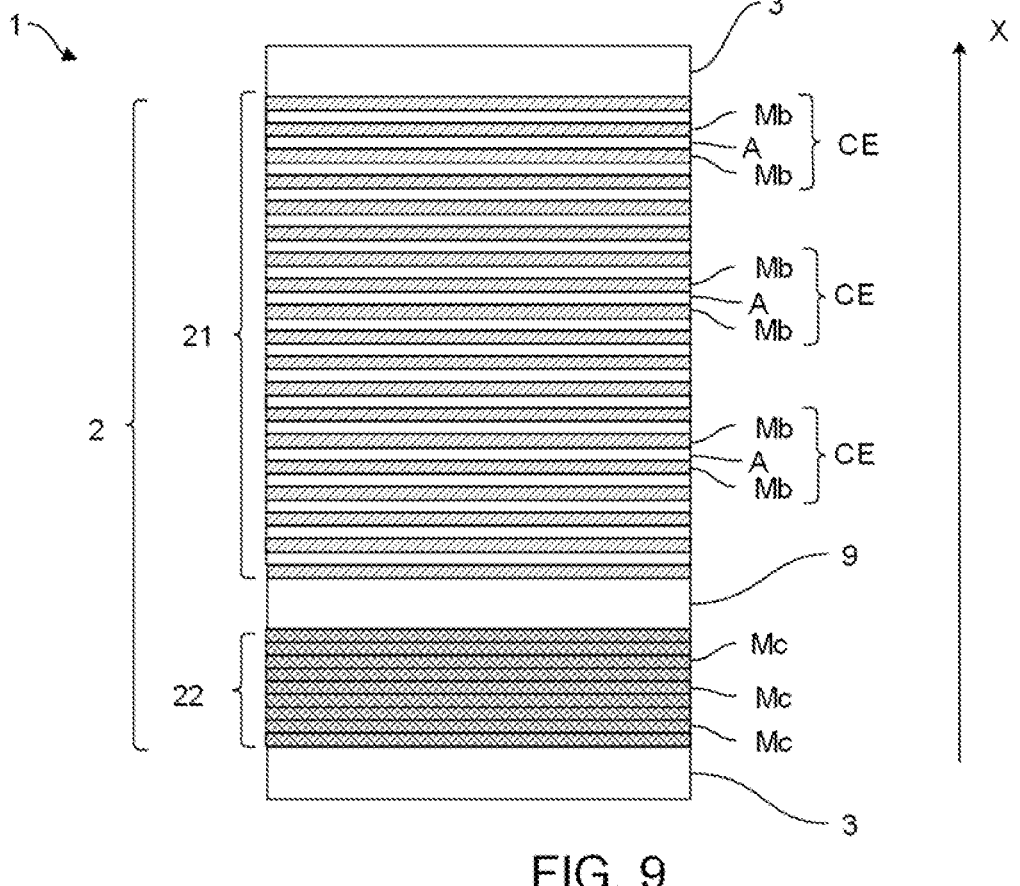
Figure 13:
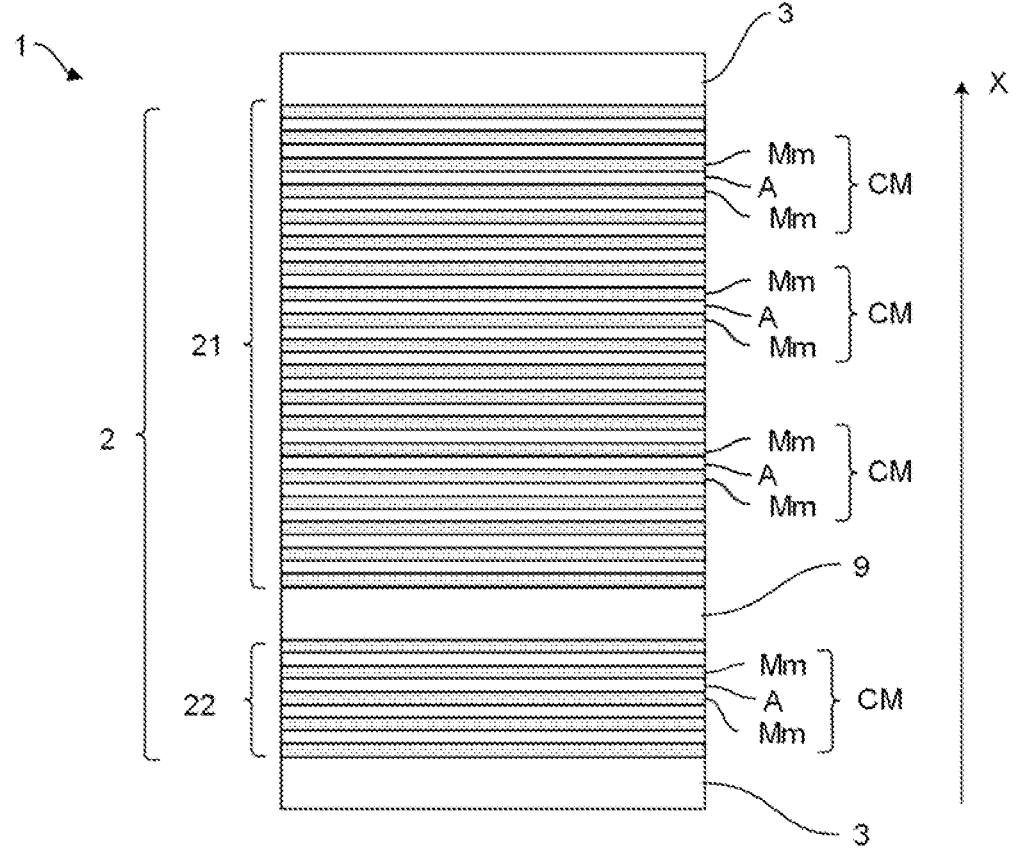

In reference to FIGS. 9 and 13, in one embodiment, the fuel cell 1 comprises an intermediate plate 9 between the end plates 3 defining a first stacking part 21 and a second stacking part 22. Such an intermediate plate 9 makes it possible to form a separation between the modules of the fuel cell 1, in particular, to supply or remove fluids from one or the other of the stacking parts 21, 22 of the fuel cell 1.

In a first embodiment, shown in FIG. 9, the first stacking part 21 and the second stacking part 22 are of different natures. In particular, each module of the first stacking part 21 is a bipolar module Mb and each module of the second stacking part 22 is a heating module Mc. Thus, the first stacking part 21 and the second stacking part 22 are each capable of generating either only electrical energy or only heat. In this embodiment, the fuel cell 1 is formed in a simple manner by a first stacking part 21 similar to the stacking of a fuel cell of the prior art. For example, it is easy to add the second stacking part 22 for heating to an existing and known fuel cell.

In a second embodiment, shown in FIG. 13, the first stacking part 21 and the second stacking part 22 are of the same nature. Preferably, in this embodiment, the first stacking part 21 and the second stacking part 22 each comprise a plurality of mixed modules Mm, capable of generating both electrical energy and heat. Such an embodiment advantageously allows for sectoral use of the fuel cell 1 according to the power requirements of the cell. If limited electrical energy is required, this embodiment makes it possible to use only the first stacking part 21, for example, by supplying fluids only to this stacking part. Conversely, if a large amount of electrical energy is required, it is possible to use both the first stacking part 21 and the second stacking part 22.

This document shows an example of a single intermediate plate 9, however, it goes without saying that the fuel cell 1 could also comprise a different number of intermediate plates 9. In particular, the fuel cell 1 could comprise two intermediate plates 9, delimiting three separate stacking parts. The three stacking parts would allow either a sectoral use as described previously, or the delimitation for example of a central stacking part comprising a plurality of electrochemical cells CE and two side stacking parts on either side of the central stacking part each comprising a plurality of heating modules Mc. In this embodiment, the two side stacking parts would allow the central stacking part to be heated on either side.

Figure 11:
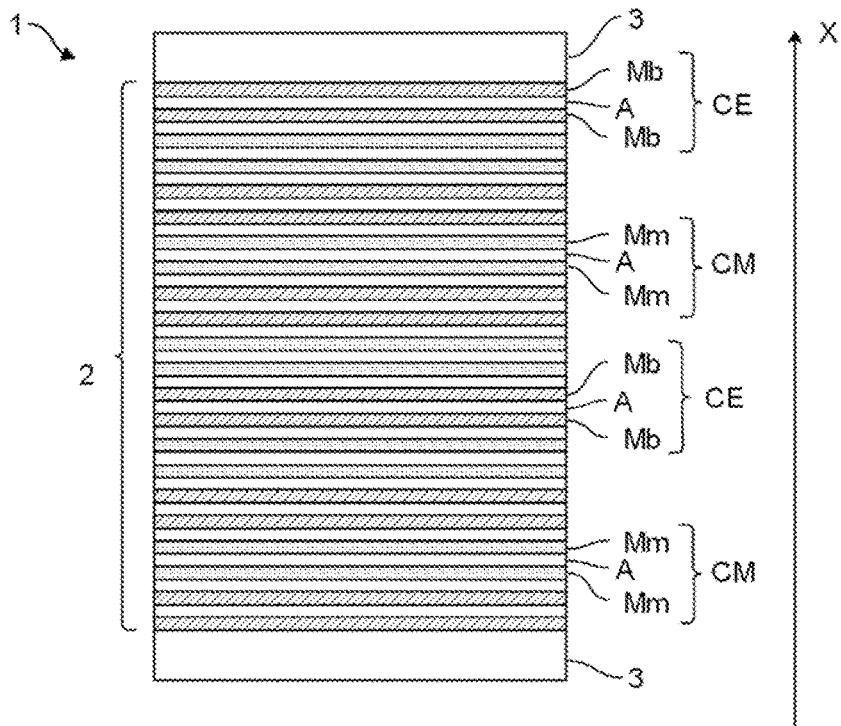
Figure 12:
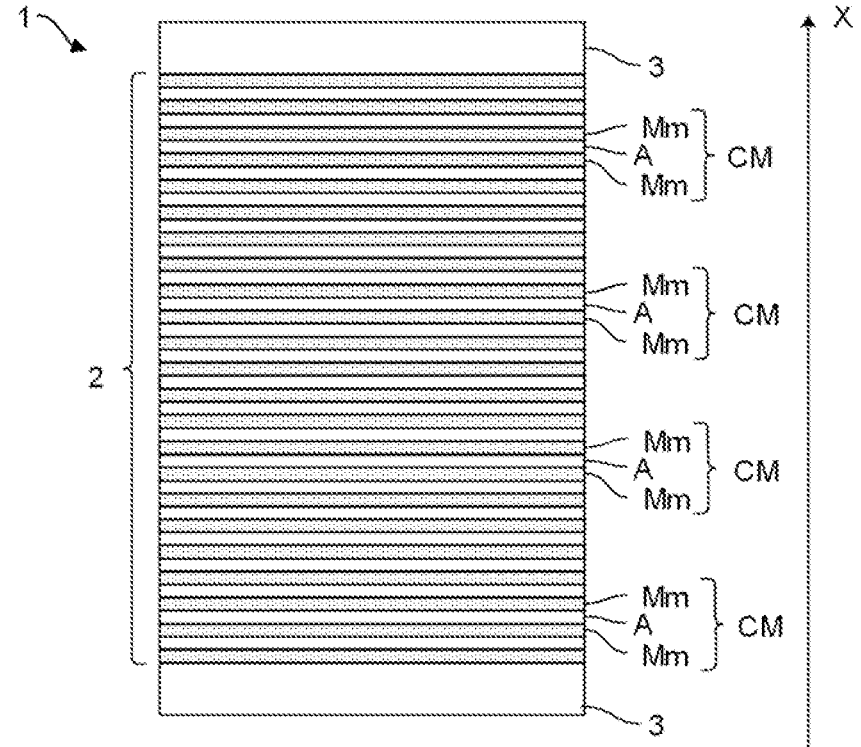

In reference to FIGS. 8 to 13, the fuel cell 1 according to the invention comprises a plurality of modules according to a plurality of possible stacks 2. As an example, the fuel cell 1 may successively comprise, along the stacking axis X between the two end plates 3:

a plurality of heating modules Mc, then a plurality of electrochemical cells CE, as shown in FIG. 8;

a plurality of heating modules Mc, an intermediate plate 9, then a plurality of electrochemical cells CE, as shown in FIG. 9;

a plurality of mixed cells CM, then a plurality of electrochemical cells CE, as shown in FIG. 10;

a plurality of pairs of an electrochemical cell CE and a mixed cell CM, as shown in FIG. 11;

a plurality of mixed cells CM, as shown in FIG. 12;

a first plurality of mixed cells CM, an intermediate plate 9, and then a second plurality of mixed cells CM, as shown in FIG. 13.

It is advantageous to use only mixed cells CM in order to heat fuel cell 1 uniformly in an integrated manner.

The different embodiments presented above are given as examples and do not present an exhaustive list of possible stacks. It goes without saying that stack 2 of fuel cell 1 may comprise any stack of one or more electrochemical cells EC and/or one or more mixed cells CM whether or not associated with one or more heating modules Mc.

Figure 14:
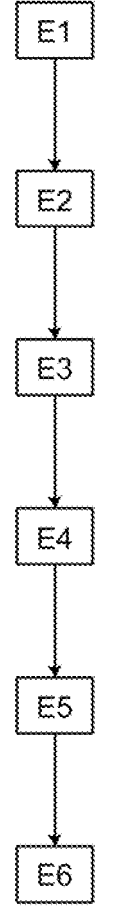
FIG. 14 is a schematic representation of the steps of a method of using the fuel cell according to the invention.

A method of using the fuel cell 1 such as described previously, in reference to FIG. 14, will now be described. In this example, the fuel cell 1 comprises a plurality of heating modules Mc and a plurality of bipolar modules Mb, each pair of two bipolar modules Mb being separated by a membrane-electrode assembly A to form a plurality of electrochemical cells CE as shown in FIG. 8.

The method first comprises a step E1 of circulating the oxidizing fluid and the reducing fluid in the auxiliary channel Ca of each heating module Mc. The mixture of the oxidizing fluid and the reducing fluid is then brought into contact with the catalyst chemical element 7, resulting in the generation of heat, in a heating step E2.

The heat-transfer fluid then circulates in the third main channel Cc of each heating module Mc and heats in a step E3. The heat-transfer fluid then circulates, in a step E4, in the third main channel Cc of each bipolar module Mb, in order to heat each electrochemical cell CE to allow their initial temperature increase. Preferably, steps E1 and E2 are implemented simultaneously.

When the temperature of the fuel cell 1 has reached an operating temperature greater than or equal to a predetermined threshold, for example 150° C., the method finally comprises a step E5 of stopping the circulation of the oxidizing fluid and the reducing fluid in the auxiliary channel Ca of each heating module Mc, so as to stop the generation of heat from the mixture between the oxidizing fluid, the reducing fluid and the catalyst chemical element 7.

The oxidizing fluid and the reducing fluid then circulate in the first main channel Co and in the second main channel Cr of each electrochemical cell CE, so as to generate electrical energy, in a step E6.

Alternatively, when the fuel cell 1 has reached an initial temperature, for example 100° C., the oxidizing fluid and reducing fluid begin to flow through the first main channel Co and the second main channel Cr of each electrochemical cell CE, so as to start generating electrical energy. The temperature continues to rise until the operating temperature of fuel cell 1 is reached, preferably between 150° C. and 180° C. When the temperature of the fuel cell 1 reaches the operating temperature, the circulation of the oxidizing fluid and the reducing fluid is stopped in the auxiliary channel Ca of each heating module Mc, in the same way as the stop step E5 described previously. The oxidizing fluid and the reducing fluid then continue to circulate in the first main channel Co and in the second main channel Cr of each electrochemical cell CE, so as to generate electrical energy.

In an alternative embodiment, in the case of a heating module Mc being free of the circulation channel Cc of the heat-transfer fluid, the method comprises the step E1 of circulating the oxidizing fluid and the reducing fluid in the auxiliary channel Ca of each heating module Mc. The mixture of oxidizing fluid and reducing fluid is brought into contact in the auxiliary channel Ca with the catalyst chemical element 7, resulting in the generation of heat, in the heating step E2. Each electrochemical cell CE and therefore each bipolar module Mb is heated by conduction. When the fuel cell 1 reaches the initial temperature or the operating temperature, the oxidizing fluid and the reducing fluid circulate in the first main channel Co and in the second main channel Cr of each electrochemical cell CE to enable the generation of electrical energy.

The fuel cell according to the invention advantageously makes it possible to heat each electrochemical cell directly by circulating the heat-transfer fluid heated in the heating modules, integrated into the fuel cell between the two end plates or by conduction between the electrochemical cells EC. The heating modules internal to the fuel cell, positioned as close as possible to the electrochemical cells, make it possible to limit heat losses while limiting the size of the fuel cell, which does not require an external device or a supply battery, for example.

A fuel cell comprising a stack of a plurality of mixed cells allows, by means of cells wherein the mixed modules integrate an auxiliary channel for heating the heat-transfer fluid, to integrate directly the heating function by means of a fuel cell with a size similar to the size of a fuel cell of the prior art, which makes it possible to heat the fuel cell for use in any environment and under any temperature, while allowing neither the mass nor the size of the fuel cell to be increased, allowing onboard use, for example in an aircraft.

The invention claimed is:

1. A fuel cell extending longitudinally along a stacking axis, the fuel cell comprising:

alternating bipolar modules and membrane-electrode assemblies so as to form a stack comprising at least one electrochemical cell, two end plates extending to ends of the stack, each of the bipolar modules comprising at least one first main channel for circulation of an oxidizing fluid, a second main channel for circulation of a reducing fluid and a third main channel for circulation of a heat-transfer fluid, at least one heating module mounted between the end pates, comprising at least one auxiliary channel comprising a catalyst chemical element, the at least one auxiliary channel being configured to circulate a mixture of the oxidizing fluid and the reducing fluid so as to generate heat during reaction of the oxidizing fluid, the reducing fluid and the catalyst chemical element in order to heat the fuel cell, at least one bipolar module being used as the at least one heating module so as to define a mixed module, the mixed module comprising at least one first main channel for the circulation of the oxidizing fluid, a second main channel for the circulation of the reducing fluid, a third main channel for the circulation of the heat-transfer fluid and an auxiliary channel, comprising a catalyst chemical element, which is configured to circulate a mixture of the oxidizing fluid and the reducing fluid, the mixed modules comprises a first bipolar plate and a second bipolar plate, the first bipolar plate and the second bipolar plate each comprising at least one concave portion external to the mixed module and one convex portion internal to the mixed module, the convex portion of the first bipolar plate being positioned opposite the convex portion of the second bipolar plate, the convex portions mounted opposite one another forming a circulation channel, wherein the mixed modules comprises a spacer plate, mounted between the first bipolar plate and the second bipolar plate so as to form in the circulation channel, the third main channel for the circulation of the heat-transfer fluid and the auxiliary channel.

2. The fuel cell according to claim 1, wherein the at least one heating module comprises at least one main channel for the circulation of the heat-transfer fluid.

3. The fuel cell according to claim 1, wherein the at least one heating module is free of a main channel for the circulation of the oxidizing fluid and of a main channel for the circulation of the reducing fluid.

4. The fuel cell according to claim 1, further comprising a plurality of heating modules.

5. The fuel cell according to claim 1, further comprising at least two of the mixed modules and at least one of the membrane-electrode assemblies positioned between the two mixed modules so as to form a mixed cell capable of generating both electrical energy and heat.

6. The fuel cell according to claim 1, further comprising an alternation of a plurality of the mixed modules and membrane-electrode assemblies so as to form the stack of a plurality of mixed cells.

7. The fuel cell according to claim 1, comprising at least one intermediate plate between the end plates defining a first stacking part comprising a first plurality of modules and a second stacking part comprising a second plurality of modules.

8. The fuel cell according to claim 7, wherein each module of the first stacking part is a bipolar module and each module of the second stacking part is a heating module.

9. The fuel cell according to claim 7, wherein all the modules of the first stacking part and the second stacking part are mixed modules.

10. The fuel cell according to claim 1, wherein the catalyst chemical element is platinum.

11. A method of using the fuel cell according to claim 1, the method comprising:

a heating step of the fuel cell by circulating the oxidizing fluid and the reducing fluid in the auxiliary channel of the at least one heating module, and then, a step of generating electrical energy by circulating the oxidizing fluid and the reducing fluid in the bipolar modules.

* * * * *